(12) United States Patent
Sharkey (10) Patent No.: US 8,930,734 B1
(45) Date of Patent: *Jan. 6, 2015

(54) MANAGING POWER STATES OF A COMPUTING DEVICE

(75) Inventor: Jeffrey Allen Sharkey, Mountain View, CA (US)

(73) Assignee: Google Inc., Mountain View, CA (US)

(*) Notice: Subject to any disclaimer, the term of this patent is extended or adjusted under 35 U.S.C. 154(b) by 542 days.

This patent is subject to a terminal disclaimer.

(21) Appl. No.: 13/221,359

(22) Filed: Aug. 30, 2011

Related U.S. Application Data (60) Provisional application No. 61/469,496, filed on Mar. 30, 2011.

(51) Int. Cl.
*G06F 1/32* (2006.01)

(52) U.S. Cl.
USPC .................... 713/320; 713/300; 713/324

(58) Field of Classification Search
None
See application file for complete search history.

(56) References Cited

U.S. PATENT DOCUMENTS

| | | | |
|---|---|---|---|
| 6,504,530 B1 * | 1/2003 | Wilson et al. | 345/173 |
| 2003/0085870 A1 | 5/2003 | Hinckley | |
| 2005/0035955 A1 | 2/2005 | Carter et al. | |
| 2008/0108396 A1 | 5/2008 | Lundqvist | |
| 2008/0218183 A1 | 9/2008 | Sato | |
| 2008/0277171 A1 | 11/2008 | Wright | |
| 2009/0140863 A1 * | 6/2009 | Liu et al. | 340/573.1 |
| 2010/0009650 A1 | 1/2010 | Orr et al. | |
| 2010/0013778 A1 | 1/2010 | Liu et al. | |
| 2010/0042827 A1 | 2/2010 | Pratt et al. | |
| 2010/0138680 A1 | 6/2010 | Brisebois et al. | |
| 2010/0182270 A1 * | 7/2010 | Caliskan et al. | 345/174 |
| 2010/0205472 A1 | 8/2010 | Tupman et al. | |
| 2011/0018817 A1 | 1/2011 | Kryze et al. | |
| 2011/0080349 A1 | 4/2011 | Holbein et al. | |
| 2011/0167391 A1 | 7/2011 | Momeyer et al. | |
| 2012/0254631 A1 * | 10/2012 | Skillman et al. | 713/300 |

OTHER PUBLICATIONS

Office Action from U.S. Appl. No. 13/250,613, dated Dec. 14, 2011, 25 pp.
Response to Office Action dated Dec. 14, 2011, from U.S. Appl. No. 13/250,613, filed Mar. 24, 2012, 14 pp.

* cited by examiner

*Primary Examiner* — Paul Yanchus, III
(74) *Attorney, Agent, or Firm* — Shumaker & Sieffert, P.A.

(57) ABSTRACT

In general, this disclosure describes techniques for managing power consumption states of a computing device. In one example, a method includes detecting, using at least one sensor of a computing device comprising a plurality of components, at least one indication of user contact with at least one surface of the computing device, wherein the at least one indication of user contact conforms with a touch pattern. The method further includes in response to detecting the at least one indication of user contact with at least one surface of the computing device, modifying a power consumption state of the computing device, wherein which components of the computing device receive power is based on the power consumption state.

17 Claims, 4 Drawing Sheets

MANAGING POWER STATES OF A COMPUTING DEVICE

CLAIM OF PRIORITY

This application relates to and claims the benefit of priority to Provisional Application No. 61/469,496, filed Mar. 30, 2011, which is assigned to the assignee hereof and is hereby expressly incorporated by reference herein.

TECHNICAL FIELD

The disclosure relates to managing power states of a computing device.

BACKGROUND

Some electrical devices may be configured to be turned on based on the detection of user touch. For example, a lamp or other electrical device may include one or more sensors configured to detect human touch with one or more surfaces of the device. As one example, an electrical device may include one or more capacitive sensors configured to detect a discharge of electrical energy caused by user touch. As another example, an electrical device may include one or more resistive sensors configured to detect a change in a detected resistance due to user touch.

SUMMARY

In one example, a method includes detecting, using at least one sensor of a computing device comprising a plurality of components, at least one indication of user contact with at least one surface of the computing device, wherein the at least one indication of user contact conforms with a touch pattern. The method further includes in response to detecting the at least one indication of user contact with at least one surface of the computing device, modifying a power consumption state of the computing device, wherein which components of the computing device receive power is based on the power consumption state.

In another example, a tangible computer-readable medium is encoded with instructions for causing a processor to perform operations including: detecting, using a first sensor of a computing device having a plurality of components, at least one first indication that the mobile device is being held by a user, activating, based on the first indication, at least one second sensor of the computing device, detecting, using the at least one second sensor of the computing device, at least one second indication that the computing device is being held by the user, and responsive to detecting the at least one first indication and the at least one second indication, modifying a power consumption state of the computing device, wherein the power consumption state determines what components of the computing device are powered on.

In another example, a computing device comprises one or more processors. The computing device further comprises at least one surface of the computing device and means for detecting user contact with at least a portion of the at least one surface of the computing device, wherein the at least one indication of user contact conforms with a touch pattern. A power consumption state of the computing device is modified based at least in part on a detected user contact, wherein the power consumption state determines how power is available throughout the computing device.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

In accordance with common practice, the various described features are not drawn to scale and are drawn to emphasize features relevant to the present invention. Like reference characters denote like elements throughout the figures and text.

DETAILED DESCRIPTION

Techniques of the present disclosure allow a computing device to modify a power consumption state of the computing device based at least in part on a detected user touch of the device. In some examples, a computing device, such as a mobile device, may be configured to operate according to a plurality of power consumption states. For example, a mobile device may be operated in an active state (e.g., wherein substantially all functionality of the device is available to a user), a sleep state (e.g., a low power state, where at least some functionality of the mobile device is disabled), and a power down state (e.g., where substantially all functionality of the mobile device is disabled).

In some examples, it may be desirable to reduce a number of physical buttons of a mobile device to lower manufacturing costs, increase resilience of the mobile device to environmental conditions (e.g., moisture, temperature, debris, etc.), and/or improve user experience when using the mobile device. The present disclosure is directed to techniques for modifying a power consumption state (e.g., active, sleep, or power down states as described above) of a device based on one or more detected indications that the device is being held or otherwise touched by a user. According to one example consistent with these techniques, a mobile device may not include any physical buttons dedicated to controlling power consumption state of the mobile device.

According to one example consistent with the techniques of this disclosure, a mobile device may include at least one surface configured to detect user touch (e.g., a touch-sensitive surface). The at least one touch-sensitive surface may comprise one or more of a display surface or non-display surface of the device. According to one example, a mobile device may include a plurality of touch-sensitive surfaces. For example, a mobile device may include a touch-sensitive surface at a back (e.g., opposite a display surface), side, or edge surface of the device in addition to a touch-sensitive display surface.

According to one example, a touch-sensitive surface may include a plurality of sensor elements configured to detect a change in one or more electrical or other properties caused by user touch. According to one example consistent with the techniques of this disclosure, one or more touch-sensitive surfaces of a device may be divided into a plurality of mutually distinct regions. According to this example, if the device detects touch at more than one of the mutually distinct regions simultaneously, then the device may determine that a user may be holding the device.

According to another example, where a mobile device includes a plurality of touch-sensitive surfaces, the mobile device may be configured to modify a power consumption state based on whether touch is detected by at least two of the plurality of touch-sensitive surfaces. For example, a device may be configured to determine whether a user is holding the device based on detection of user contact with both a front (display) and back (non-display) surface of the mobile device. As another example, a device may be configured to determine whether a user is holding the device based on detection of user touch in contact with at least two side (or edge) surfaces of the mobile device. In still another example, a device may be configured to determine whether a user is holding the device based on detection of user contact with at least one edge surface and at least one back (non-display) surface of the mobile device. In another example, a device may be configured to determine whether a user is holding the device based on an algorithm that determines whether a detected touch or touch pattern is similar to a touch by a human hand.

Electrical devices such as those described above may include one or more sensors that consume a relatively large amount of power to operate. As such, these techniques may not be desirable for a device with a finite power source, such as a mobile device configured to operate based on a limited battery supply, because constant operation of one or more sensors to detect touch for purposes of device activation may consume a relatively large amount of power.

Figure 1:
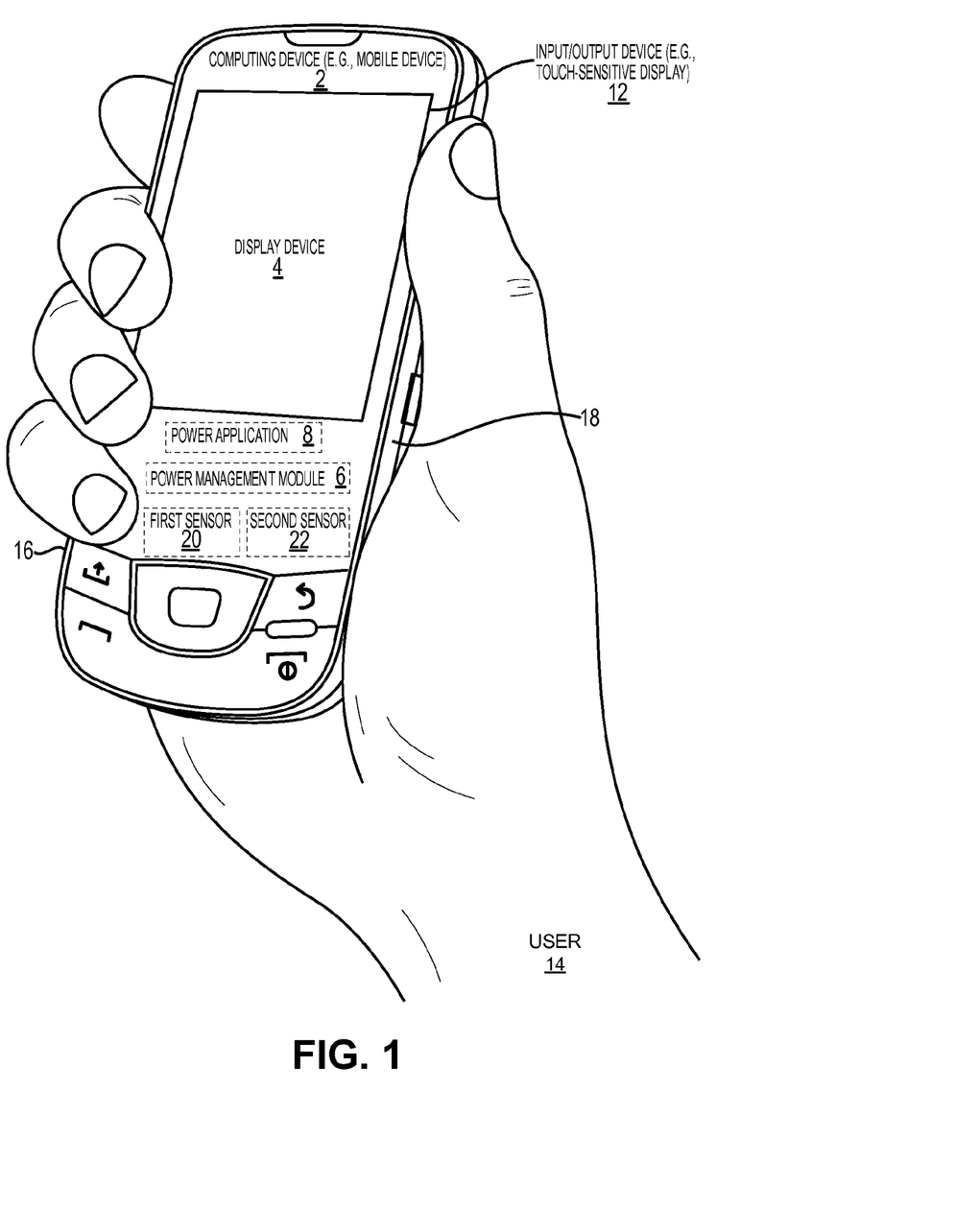
FIG. 1 is a block diagram illustrating an example of a computing device, being held by a user, which may execute one or more applications and modify a power consumption state based on user touch, in accordance with one or more aspects of the present disclosure.

FIG. 1 is a block diagram illustrating an example of a computing device 2, being held by a user 14, that may execute one or more applications and modify a power consumption state based on user touch, in accordance with one or more aspects of the present disclosure. Computing device 2 may be, in some examples, a portable computing device (e.g., a mobile phone, netbook, laptop, personal data assistant (PDA), tablet device, portable gaming device, portable media player, e-book reader, or a watch) as well as part of a non-portable devices (e.g., a desktop computer). For purposes of illustration only, in this disclosure, computing device 2 is described as a portable or mobile device that a user 14 can carry, such as a laptop, or a mobile phone, but aspects of this disclosure should not be considered limited to such devices.

Computing device 2 may include a display device 12 (e.g., a touch-sensitive device), a first surface 16, a second surface 18, a first sensor 20, and a second sensor 22. In some examples, display device 12 may comprise a display device 4. In some examples, display device 4 may be capable of receiving touch input from a user 14 (e.g., touch screen, track pad, track point, or the like). User 14 may interact with display device 12, for example, by performing touch input on display device 4. One example of computing device 2 is more fully described in FIG. 2, discussed below.

In some examples, first surface 16 and second surface 18 may be external surfaces of computing device 2. For example, first surface 16 and second surface 18 may be a portion of a housing or outer casing that contains some or all components of computing device 2. In another example, one or both of first surface 16 and second surface 18 may be a region of the input/output device 12. FIG. 1 shows one example of the orientation and location of first and second surfaces 16 and 18. In other examples, the orientations and locations of first surface 16 and second surface 18 may be different. In one example, first surface 16 and second surface 18 may be associated with first sensor 20 and second sensor 22, respectively. Sensor 20 may generate a signal indicating user contact when user 14 touches first surface 16. Likewise, sensor 22 may generate a signal indicating user contact when user 14 touches second surface 18.

Computing device 2 may include a power application 8 that, when executed, provides functionality to computing device 2 to manage a power consumption state of computing device 2. In some examples, computing device 2 may be configured to operate according to a plurality of power consumption states. A power consumption state may be a mode of operation that determines what devices, components, or functionality of computing device 2 may operate or receive power while computing device 2 is in that power consumption state. For example, computing device 2 may be operated in an active state (e.g., a high power state wherein substantially all functionality of the device is available to a user), a sleep state (e.g., a low power state, where at least some functionality of the mobile device is disabled), and a power down state (e.g., where substantially all functionality of the mobile device is disabled). A power consumption state may determine how power is available throughout computing device 2.

Power application 8 may include a power management module 6 that, in various instances, provides computing device 2 with capabilities to change the power consumption state of computing device 2, or of components within computing device 2, based at least partially on detected user contact with computing device 2. For example, power management module 6 changes the power consumption state from a relatively low power state to a relatively high power state upon detection of at least one indication of user contact. In some examples, power management module 6 powers on or off certain components of computing device 2 based on a selected power consumption state.

In one example, power application 8 may include functionality of user selectable options for conditions under which the power management module 6 changes the power consumption state of the computing device 2. In another example, power management module 6 alters the power consumption state or the requirements for activating computing device 2 based on a current level of battery 42. For example, when the level of battery 42 is relatively high, power management module 6 may power on computing device 2 upon receiving a single indication of user contact. When the level of battery 42 is relatively low or below a threshold battery level, power management module 6 may power on computing device when more than one indication of user contact is received.

First sensor 20 may send a signal to power application 8 that indicates user contact when user 14 is touching first surface 16. Likewise, second sensor 22 may send a signal to power application 8 that indicates user contact when user 14 is touching second surface 18. In one example, when power application 8 receives at least one signal that indicates user contact, power management module 6 may change the power consumption state of computing device 2. For example, power management module 6 may power on computing device 2, shut down computing device 2, wake up computing device 2, put computing device 2 into a sleep state, active state, low power state, or high-power state. In one example, power management 6 may modify the power consumption state of computing device 2 directly. In other examples, power management 6 may modify the power consumption state of computing device 2 through operating system 44.

For example, computing device 2 may be in a low power state, in which the first sensor 20 is powered on. Upon detecting a touch from user 14 at first surface 16, first sensor 20 sends an indication of user contact to power application 8. Power management module 6 may receive the indication or a signal related to the indication and may power up the computing device 2. In some examples, other power consumption states are selected based on additional input from user 14. In other examples, power management module 6 changes the power consumption state of only a portion of computing device 2 upon a first indication of user contact (e.g., second sensor 22 is woken from a sleep state when first sensor 20 detects user contact).

In another example, first sensor 20 or second sensor 22 may operate in different resolution modes. Different resolution modes may be entered based on a current power consumption state of computing device 2. For example, where first sensor 20 is a touch-sensitive sensor, first sensor 20 may detect at a first resolution during a low-power mode and at a second resolution during a high-power mode. For example, first sensor 20 may function as a grid having a number of sensing nodes. In one example, first sensor 20 may detect at a resolution of 8×8 sensing nodes in a low-power mode. In a high-power mode, first sensor 20 may operate at a higher resolution than it does in low-power mode. For example, first sensor 20 may operate at a resolution of 128×128 sensing nodes in a high-power mode.

In one example, first and second sensors 20 and 22 are touch-sensitive sensors. In another example, first surface 16 and first sensor 20 may be combined into a single device, for example, a touch-sensitive device (e.g., track pad, touch screen, track point, or the like). Similarly, in a further example, second surface 18 and second sensor 22 may also be combined into a single touch-sensitive device. In another example, first and second sensors 20 and 22 may be proximity sensors that detect when user 14 is proximate to first surface 16 and second surface 18, respectively. In one example, at least one of first surface 16 or second surface 18 may comprise a presence-sensitive device. In other examples, at least one of first surface 16 or second surface 18 may be a touch-sensitive display surface. In yet other examples, at least one of first surface 16 or second surface 18 may be a touch-sensitive non-display surface.

In one example, first surface 16 may be disposed on a first edge of computing device 2 and second surface 18 may be disposed on a second edge of computing device 2. In some examples, the second edge is opposite the first edge. For example, first surface 16 may be located on a left edge and second surface 18 may be located on a right edge of computing device 2. In such an example, a hand of user 14 may contact both surfaces 16 and 18 while holding computing device 2, as shown in FIG. 1. In another example, first surface 16 may be located on a top edge and second surface 18 may be located on a bottom edge. In yet another example, first surface 16 may be disposed on a front of computing device 2 while second surface 18 may be disposed on a back of computing device 2.

In other examples, first surface 16 and second surface 18 may be two different regions of the same surface. For example, computing device 2 may have a single surface that may detect user touch, where power management module 6 activates computing device 2 when a left side and a right side of the surface are approximately simultaneously touched by user 14. In other examples, computing device 2 may have other numbers of regions and surfaces. In one example, power management module 6 determines that computing device 2 is being held by a user when user contact with a plurality of regions of at least one surface 16 is detected. In another example, power management module 6 determines that computing device 2 is being held by a user when user contact with a plurality of predefined regions of the at least one surface 18 is detected. In yet another example, power management module 6 determines that computing device 2 is being held by a user when user contact with a plurality of regions disposed on a plurality of surfaces 16 and 18 is detected. As such, any combination of regions and surfaces may be used to trigger power management module 6 to modify the power consumption state of computing device 2.

Figure 2:
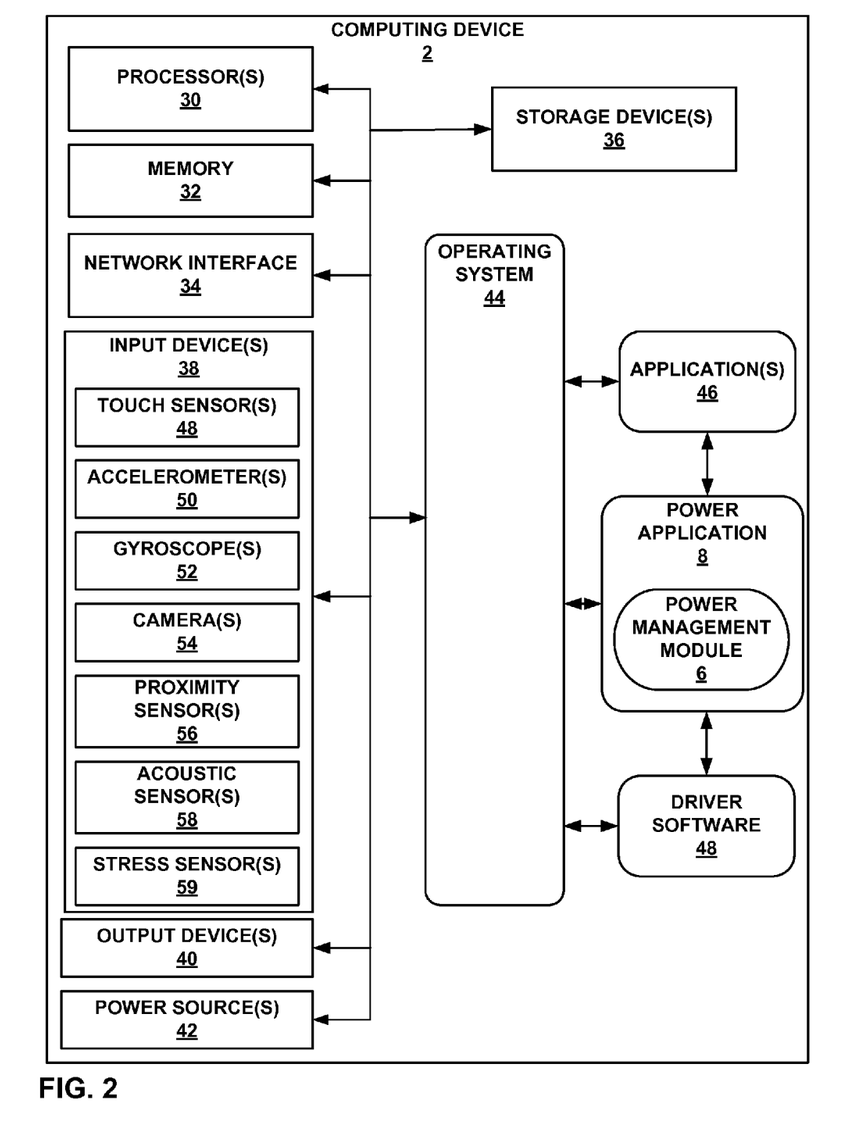
FIG. 2 is a block diagram illustrating further details of one example of computing device shown in FIG. 1, in accordance with one or more aspects of the present disclosure.

FIG. 2 is a block diagram illustrating further details of one example of computing device 2 shown in FIG. 1. FIG. 2 illustrates only one particular example of computing device 2, and many other example embodiments of computing device 2 may be used in other instances. In one example, computing device 2 is a mobile device.

As shown in the example of FIG. 2, computing device 2 may include a plurality of components, including one or more processors 30, memory 32, a network interface 34, one or more storage devices 36, one or more input devices 38, one or more output devices 40, and a battery 42. Computing device 2 also includes an operating system 44. Computing device 2 may include one or more applications 46 and power application 8. Power application 8 may include power management module 6 executable by computing device 2. Operating system 44, applications 46, and power application 8 are also executable by computing device 2. Each of components 30, 32, 34, 36, 38, 40, 42, 44, 46, 6, and 8 may be interconnected (physically, communicatively, and/or operatively) for inter-component communications.

Processors 30 may be configured to implement functionality and/or process instructions for execution in computing device 2. Processors 30 may be capable of processing instructions stored in memory 32 or instructions stored on storage devices 36.

Memory 32 may be configured to store information within computing device 2 during operation. Memory 32 may, in some examples, be described as a tangible or non-transitory computer-readable storage medium. In some examples, memory 32 is a temporary memory, meaning that a primary purpose of memory 32 is not long-term storage. Memory 32 may also, in some examples, be described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art. In some examples, memory 32 may be used to store program instructions for execution by processors 30. Memory 32 may be used by software or applications running on computing device 2 (e.g., one or more of applications 46) to temporarily store information during program execution.

Storage devices 36 may also include one or more computer-readable storage media. Storage devices 36 may be configured to store more information than memory 32, however, storage devices 36 may store the same or less information than memory 32. Storage devices 36 may further be configured for long-term storage of information. In some examples, storage devices 36 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In one example, one or more storage devices 36 may contain data indicating sensor signal patterns associated with the device being held by user 14. Power management module 6 may compare a detected touch to the signal patterns to determine if user 14 is holding computing device 2.

Computing device 2 also includes a network interface 34. Computing device 2 may utilize network interface 34 to communicate with external devices via one or more networks. In one example, network interface 34 may correspond to an interface for receiving data from computing devices. In some examples, input and output network interfaces 34 may be functionally integrated, while in other examples, input and output interfaces may be separate interfaces of network interface 34. Network interface 34 may be a network interface card, such as an Ethernet card, configured to communication over, for example, Ethernet, transmission control protocol (TCP), Internet protocol (IP), asynchronous transfer mode (ATM), or other network communication protocols. In other examples, network interface 34 may be an optical transceiver, a radio frequency transceiver, or any other type of device that can send and receive information. Examples of such network interfaces may include Bluetooth®, 3G and WiFi® radios in mobile computing devices as well as USB. Examples of such wireless networks may include WiFi®, Bluetooth®, and 3G. In some examples, computing device 2 may utilize network interface 34 to wirelessly communicate with an external device, such as a server, a mobile phone, or other networked computing device. In some examples, computing device 2 may include a plurality of either or both input and output interfaces.

Computing device 2 may also include one or more input devices 38. Input device 38 may be configured to receive input from a user, such as user 14, through tactile, displacement, audio, or video feedback. Examples of input device 38 may include a touch-sensitive display, mouse, a keyboard, a voice responsive system, a microphone, video camera, or any other type of device for detecting a command from user 14. As shown in FIG. 2, input devices 38 of computing device 2 may include one or more touch sensors 48 (for example, first and second sensors 20 and 22 as shown in FIG. 1), one or more accelerometers 50, one or more gyroscopes 52, one or more cameras 54, one or more proximity sensors 56, and one or more acoustic sensors 58.

Computing device 2 may also include one or more stress sensors 59. In one example, one or more stress sensors 59 may be used to detect torque forces applied to computing device 2 by gravity. For example, if user 14 picks up an edge of computing device 2, an internal stress is induced along one axis of computing device 2. Stress sensors 59 may detect this internal stress and provide stress data to power application 8 or power management module 6. This stress data may be used as an additional input into power management module 6 for determining user contact. For example, computing device 2 may be powered on when user contact is detected with a back of computing device 2 and one or more stress sensors 59 provide stress data that approximately matches a model predicted by a weight of computing device 2 and a direction of gravity.

One or more output devices 40 may also be included in computing device 2, e.g., display device 12. Output device 40 may be configured to provide output to user 14 using tactile, audio, or video output. Output device 40 may include a touch-sensitive display and may utilize a sound card, a video graphics adapter card, or any other type of device for converting a signal into an appropriate form understandable to humans or machines. Additional examples of output device 40 may include a speaker, a cathode ray tube (CRT) monitor, a liquid crystal display (LCD), or any other type of device that can provide output to user 14.

Computing device 2 may include one or more power sources 42, which may be rechargeable and provide power to computing device 2. The one or more power sources 42 may be one or more batteries. A battery may be made from nickel-cadmium, lithium-ion, or any other suitable material.

Computing device 2 may include operating system 44. Operating system 44 may control the operation of components of computing device 2. For example, operating system 44 may facilitate the interaction of application 46 or power application 8 with processors 30, memory 32, network interface 34, storage device 36, input device 38, output device 40, and battery 42.

Computing device 2 may include driver software 48 that, when executed, may provide functionality to computing device 2 to control the power state of components of computing device 2. In one example, driver software 48 controls which components of computing device 2 receive power based on the power consumption state of the computing device 2. In one example, driver software 48 may be executed as part of operating system 44. In one example, power management 6 may modify the power consumption state of computing device 2 through driver software 48.

Power application 8 may additionally include power management module 6, which may be executed as part of operating system 44. Power management module 6 may control a power consumption state of computing device 2. Additionally, power management module 6 may receive input from a component such as processors 30, memory 32, network interface 34, storage devices 36, one or more input devices 38, one or more output devices 40, battery 42, or operating system 44. In some cases, power management module 6 may perform additional power management operations on input devices 38, such as, for example, turning on a subset of input devices 38. Power management module 6 may manage the power of input devices 38 directly, through driver software 48, or through operating system 44. In other cases, power management module 6 may transmit input to an application, e.g. application 46, or other component in computing device 2. Power management module 6 may transmit input directly to an application or through operating system 44.

In one example, power management module 6 may provide a signal to operating system 44 or driver software 48 that indicates what power consumption state computing device 2 is in (i.e., a current power consumption state). Based on this signal, operating system 44 or driver software 48 may power on or off different components of computing device 2. For example, if power management module 6 determines that user 14 has picked up computing device 2, power management module 6 sends a signal to operating system 44 or driver software 48 to power on any components of computing device 2 that were previously powered off. In other examples, power application 8 may directly signal components of computing device 2, such as sensors 48, 50, 52, 54, 56, 58, or 59, to power on.

Any applications, e.g. application 46 or power application 8, implemented within or executed by computing device 2 may be implemented or contained within, operable by, executed by, and/or be operatively/communicatively coupled to components of computing device 2, e.g., processors 30, memory 32, network interface 34, and/or storage devices 36.

Figure 3:
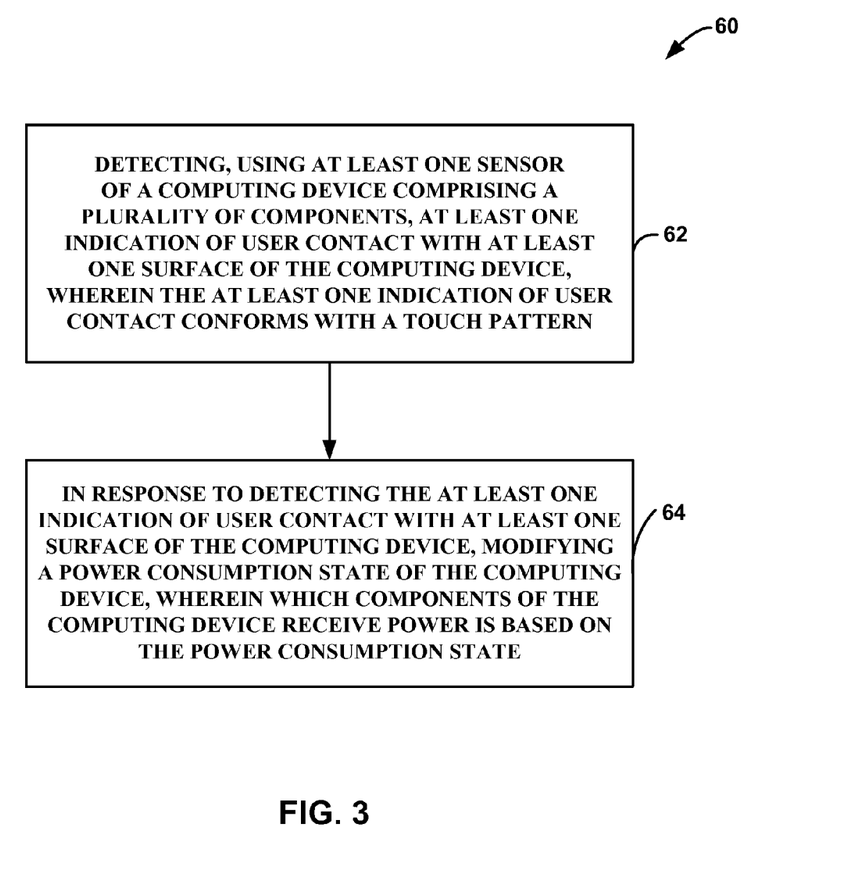
FIG. 3 is a flow chart illustrating an example method that may be performed by a computing device to modify a power consumption state of the computing device, in accordance with one or more aspects of the present disclosure.

FIG. 3 is a flow chart illustrating an example method 60 that may be performed by a computing device to modify a power consumption state of the computing device when touched by a user, in accordance with one or more aspects of the present disclosure. For example, method 60 may be performed by computing device 2 as shown in FIG. 1 or 2.

Method 60 may include detecting, using at least one sensor of a computing device, at least one indication of user contact with at least one surface of the computing device, wherein the computing device comprises a plurality of components (62). Detecting an indication of user contact with at least one surface of the computing device may include detecting a stimulation of one or more sensing nodes of the at least one surface. In another example, detecting an indication of user contact with at least one surface may include sensing an increased pressure on the at least one surface. In yet further examples, detecting an indication of user contact includes detecting a touch, comparing it with hand patterns, for example, and when the touch is approximately congruent with or matching the hand patterns, determining that a user has contacted the computing device.

Method 60 may also include modifying a power consumption state of the computing device in response to detecting the at least one indication of user contact with at least one surface of the computing device, wherein which components of the computing device receive power is based on the power consumption state (64). Modifying a power consumption state of the computing device may include turning on or off one or more components of the computing device, increasing or decreasing power supplied to one or more components, or combinations thereof.

In one example, modifying the power consumption state of the computing device includes at least one of turning on the computing device and waking up the computing device from a low power consumption state. In some examples, the computing device may be powered off based on detecting a user touch or based on a determination that a touch is not a user touch. In another example, the at least one surface may be at least one of a touch-sensitive display surface of the computing device, at least one touch-sensitive non-display surface of the computing device, one or more of a back, front, or side surface of the computing device, and combinations thereof.

In some examples, detecting at least one indication of user contact with at least one surface of the computing device includes comparing the at least one indication of user contact with one or more touch patterns. One or more touch patterns may be representative or similar to a human hand touching or holding the computing device. These patterns may be stored on the computing device, such as in storage device 36 of FIG. 2. The touch patterns may be defined as an outline of a human hand touching the computing device. When a threshold amount of a touch is within areas of the first or second surfaces that are defined in a touch pattern, user contact may be detected. In another example, when the at least one indication of user contact conforms with a touch pattern within a threshold limit (for example, within a percentage threshold of conformity), user contact may be detected.

In another example, method 60 may also include determining that the computing device is being held by a user based on the at least one indication of user contact with at least one surface of the computing device. For example, determining that the computing device is being held by the user may include determining user contact with a plurality of regions of the at least one surface. In a further example, determining user contact with the plurality of regions of the at least one surface may further include determining user contact with a plurality of predefined regions of the at least one surface or determining user contact with the plurality of regions disposed on a plurality of surfaces of the computing device.

In some examples, the computing device may include a plurality of sensors configured to detect user touch with at least one surface of the computing device. In another example, method 60 may include operating a subset of the plurality of sensors configured to detect user touch with the at least one surface of the computing device to detect user input when computing device is not operating in an active power consumption mode. In another example, detecting the at least one indication of user contact in method 60 may further include detecting, using the subset of the plurality of sensors, the at least one indication of user contact with the at least one surface of the computing device.

In another example, the computing device may be configured to determine whether a user is holding the device based on an algorithm that determines whether the detected touch is similar to the touch of a human hand. For example, computing device 2 may detect a number (for example, four or more) of distinct contact points on the various surfaces of computing device 2. Once the number of distinct contact points is detected, power management module 6 may match the distinct contact points to an outline of a human hand. In one example, power management module 6 powers on computing device 2 when the distinct contact points approximately conform to a shape of a human hand. In another example, power management module 6 may compare a shape of one or more detected touches to an outline of a human hand. If the shape of the one or more detected touches approximately matches, is congruent with, or conforms to at least part of an outline of a human hand, power management module 6 may change the power state of computing device 2.

In one example, method 60 further includes detecting at least a second indication of user contact with at least a second surface of the computing device, wherein the second surface of the mobile device may be a first edge of the computing device. In such an example, at least one surface of the computing device may be a second edge that opposes the first edge. In some examples, the second indication of user contact may be detected within a selected threshold time period, for example, within one second, as the first indication of user contact. In other examples, both the first and second surfaces detect user contact at approximately the same time before method 60 modifies the power consumption state of the computing device.

In another example, modifying the power consumption state of the computing device may further include modifying the power consumption state in response to detecting at least the second indication of user contact. In yet another example, modifying the power consumption state of the computing device may include modifying the power consumption state in response to detecting at least the second indication of user contact while detecting the at least one indication of user contact.

In one example, modifying the power consumption state of the computing device in method 60 may further include modifying a power consumption state of at least a second sensor of the computing device. In another example, the at least one indication of user contact with the at least one surface of the computing device of method 60 may include a first indication that the computing device is being held by a user. Modifying the power consumption state of the at least the second sensor may further include activating at least the second sensor to detect at least one second indication that the computing device is being held by the user, detecting the at least one second indication, and modifying, based on the at least one second indication, the power consumption state of the computing device.

According to another example, where the computing device includes a plurality of sensors (either at a display or non-display surface) configured to detect touch when operating in an active state, a subset of the plurality of sensors may be activated when the computing device is operating in a low-power (wake), or power-down state. Accordingly, the computing device may be configured to determine one or more indications of user touch using the active subset of sensors, and thereby change an activity state based on detected touch without consuming a large amount of power.

In some examples, one or more of the sensors described above may be triggered by detection by one or more other sensors that the device is being held by a user, as described in FIG. 4 below. For example, a device may first detect, using one or more touch-sensitive sensors, user contact with at least one surface of the device. The device may determine, based on the detected user contact, that the device may be held by a user. The mobile device may, based on the detected user contact, activate at least one other sensor of the mobile device to detect at least one second indication that the device is being held by the user. For example, the mobile device may activate one or more of an accelerometer, gyroscope, proximity sensor, or camera of the mobile device to determine the at least one second indication that the mobile device is being held by the user.

Figure 4:
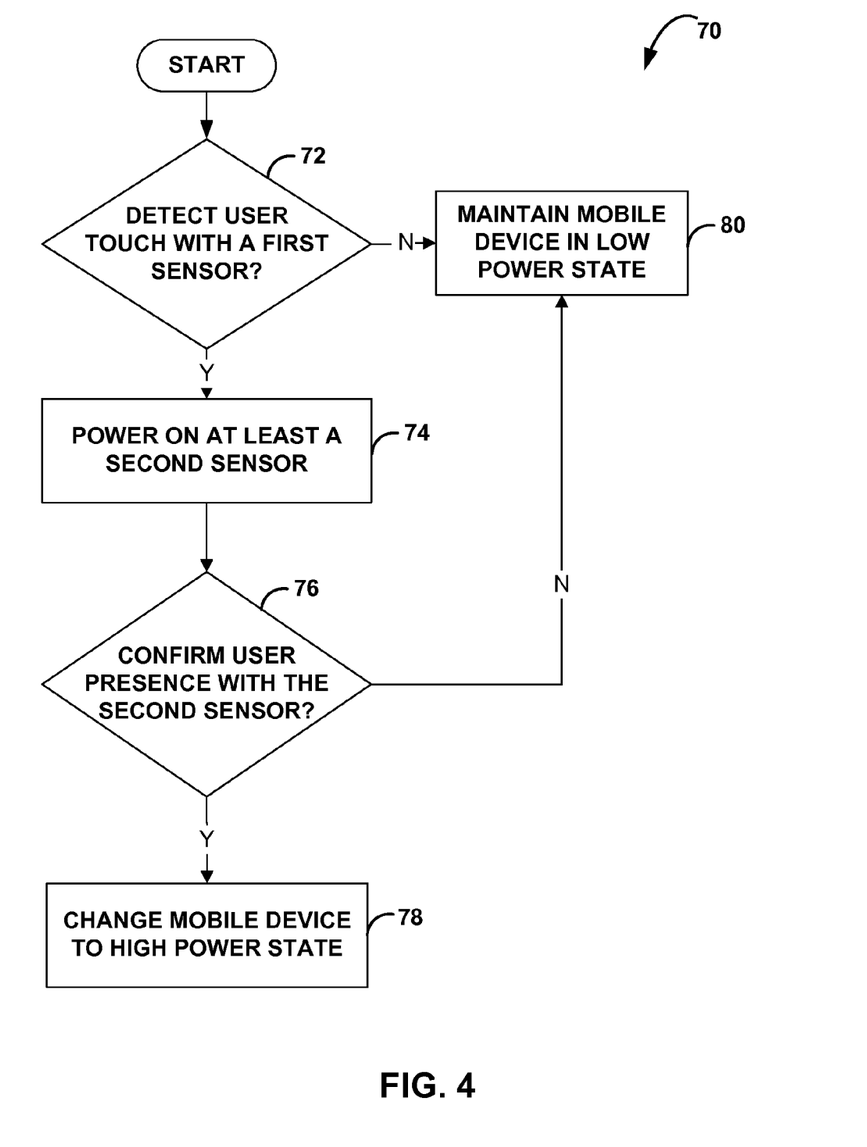
FIG. 4 is a flow chart illustrating another example method that may be performed by a computing device to modify a power consumption state of the computing device, in accordance with one or more aspects of the present disclosure.

FIG. 4 is a flow chart illustrating another example method 70 that may be performed by a mobile device to modify a power consumption state of the mobile device, in accordance with one or more aspects of the present disclosure. For example, method 70 may be performed by computing device 2 as shown in FIG. 1 or 2.

Method 70 may include detecting, with a first sensor, a user touch on a mobile device, such as computing device 2 (72). If no user touch is detected ("N" branch of 72), method 70 may maintain the mobile device in a low power state (80). In another example, method 70 may cause the mobile device to re-enter a low power state in response to a timeout or to detected user touch, such as a specific pattern of user touch. In other examples, method 70 may change the mobile device to a low power state from another state in response to a timeout or a detected user touch. For example, power management module 6 may power down some or all of computing device 2 when contact from user 14 is not detected.

If user touch is detected ("Y" branch of 72), method 70 may power on at least a second sensor (74). The second sensor may be any type of sensor configured to detect presence of the user. Method 70 may further include confirming presence of the user with the second sensor (76). If the second sensor confirms the user is present (e.g., user 14 is holding the mobile device) ("Y" branch of 76), method 70 may change the power consumption state of the mobile device to a high power state (78). If the second sensor does not confirm that the user is present ("N" branch of 72), method 70 may maintain the mobile device in a low power state (80). In such an example, the second sensor may be disabled until the first sensor no longer detects a touch. In other examples, the second sensor continues to receive power in order to detect a touch.

According to another example, a power consumption state of the mobile device may be modified based on other non-touch sensors of the device in combination with one or more touch sensors. For example, a mobile device may determine a user is holding the mobile device as described above. To verify one or more detected indications of user touch, the mobile device may determine one or more of an orientation, a movement, proximity of the mobile device to another object, or a sound.

In one example, the second sensor may be an accelerometer sensor, wherein detecting the at least one second indication includes detecting mobile device movement that indicates the mobile device is being held by the user. The accelerometer may be configured to detect a movement of the mobile device (e.g., whether the device is moving or has been moved consistent with the device being held by the user). For example, user 14 touches the mobile device and picks up the mobile device in order to use it. In such an example, user 14 makes contact with first surface 16 and first sensor 20 may provide an indication of user contact to power application 8. Upon receiving this signal, power management module 6 may power on a sleeping accelerometer 50. Accelerometer 50 may detect movement of the mobile device as user 14 lifts the mobile device. In one example, accelerometer 50 may provide a signal indicating user contact to power application 8, either directly or through operating system 44 or another application. Based on both indications of user contact, power management module 6 activates the mobile device.

In some examples, an accelerometer sensor may be used to determine that the computing device is not being held by the user. For example, a computing device, such as a mobile phone, placed in a pocket or bag may detect touches on the first or second surfaces that are from the mobile device bumping or rubbing against the pocket or bag as the user walks. These types of touches may be associated with certain signal patterns. These signal patterns may be stored in a storage device of the mobile phone, such as storage device 36 of FIG. 2. Upon detecting one or more touches, power management module 6 may compare the touches to the signal patterns. If the one or more touches are similar to the signal patterns within a threshold, power management module 6 may determine that a user is not touching the mobile device. If such a touch were detected and determined to likely not be a user touch, power management module 6 may not change the power consumption state of the mobile device.

In another example, the second sensor may be a proximity sensor, such as proximity sensor 56, wherein detecting the at least one second indication includes detecting a proximity of the mobile device to at least one object of an environment of the mobile device. Such an object may be, for example, a hand or face of user 14, or a stylus. Proximity sensor 56 may be configured to detect proximity of the mobile device to other objects or to an identified human face. In one example, a camera, such as camera 54, may be used to identify a human face proximate to the mobile device. In such an example, detecting the at least one second indication may include detecting the at least one second indication based on one or more images captured by camera 54. Known facial recognition techniques may be utilized to identify a human face from an image or video captured by camera 54. In such an example, power management module 6 may activate both proximity sensor 56 and camera 54 upon receiving at least one indication of user contact. In another example, power management module 6 may activate camera 54 without activating proximity sensor 56.

In another example, method 70 does not change the power consumption state of the mobile device when proximity sensor 56 detects at least one object. For example, if the mobile device is placed in an enclosed space (e.g., in a pocket or a bag), user 14 may not want power management module 6 to change the mobile device to a higher power state. For example, proximity sensor 56 may detect proximal objects to determine that the mobile device is not being held by a user.

In another example, the second sensor may be a gyroscope sensor, such as gyroscope 52. Gyroscope 52 may detect an orientation of the mobile device (for example, whether the mobile device is likely in a pocket of user 14, on a table or other object, or being held by user 14). In such an example, detecting the at least one second indication includes detecting an orientation of the mobile device. When power application 8 receives the at least one second indication, power application 8 may instruct operating system 44 or driver software 48 to power on or off one or more components of computing device 2.

In another example, the second sensor may be an acoustic sensor, such as acoustic sensor 58. Detecting the at least one second indication may include detecting the at least one second indication based on one or more sounds captured by acoustic sensor 58. For example, acoustic sensor 58 may provide power management module 6 with a second indication of user contact if a sound, word, or phrase spoken by user 14 matches a selected sound, word, or phrase. For example, user 14 may set the mobile device to modify the power consumption state to a high power state when user 14 speaks the phrase "power on" or "power on computer" after touching the mobile device. Any combination of sounds and their corresponding power management actions is contemplated herein.

According to one example, triggering activation of one or more sensors based on a first indication that a user is holding a mobile device may be advantageous, because the device may be configured to utilize a first, low power sensor to detect an initial indication that a user is holding a device (e.g., detected user contact), and based on the initial indication, turn on one or more higher power sensors (e.g., that consume more device power) to verify the first indication. As such, a mobile device may be configured to be powered on by touch, while minimizing an amount of power consumed to determine whether the device is being held by a user.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory or tangible media. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. Aspects or features of examples described herein may be combined with any other aspect or feature described in another example. These and other embodiments are within the scope of the following claims.

The invention claimed is:

1. A method, comprising:
   while a power consumption state of a computing device comprises a powered-down state, receiving, by the computing device, at least one indication of a user contact with at least one surface of the computing device, wherein the user contact is detected by a first sensor of the computing device, and wherein the at least one indication of the user contact conforms with a touch pattern; and
   responsive receiving the at least one indication of the user contact with the at least one surface of the computing device:
      modifying a power consumption state of a second sensor of the computing device;
      receiving, by the computing device, an indication of a user interaction with the computing device, wherein the user interaction is detected by the second sensor; and
      responsive to receiving the indication of the user interaction with the computing device, modifying the power consumption state of the computing device from the powered-down state to an active state, wherein the active state determines which of a plurality of components of the computing device receive power.

2. The method of claim 1, wherein the at least one surface comprises at least one of a touch-sensitive display surface of the computing device, a touch-sensitive non-display surface of the computing device, a back, front, or side surface of the computing device, and combinations thereof.

3. The method of claim 1, further comprising:
   determining that the computing device is being held by a user based on the user contact with a plurality of regions of the at least one surface.

4. The method of claim 3, wherein determining the user contact with the plurality of regions of the at least one surface comprises determining the user contact with a plurality of predefined regions of the at least one surface.

5. The method of claim 3, wherein determining the user contact with the plurality of regions of the at least one surface comprises determining the user contact with at least some of the plurality of regions disposed on a plurality of surfaces of the computing device.

6. The method of claim 1, wherein the second sensor comprises an accelerometer sensor, and wherein receiving the indication of the user interaction with the computing device comprises receiving an indication of computing device movement that indicates the computing device is being held by the user.

7. The method of claim 1, wherein the second sensor comprises a proximity sensor, and wherein receiving the indication of the user interaction with the computing device comprises receiving an indication of a proximity of the computing device to at least one object of an environment of the computing device.

8. The method of claim 1, wherein the second sensor comprises a gyroscope sensor, and wherein receiving the indication of the user interaction with the computing device comprises receiving an indication of an orientation of the computing device.

9. The method of claim 1, wherein the second sensor comprises a camera, and wherein receiving the indication of the user interaction with the computing device comprises:
   receiving the indication of the user interaction based on one or more images captured by the camera; and
   performing facial recognition techniques on the one or more images.

10. The method of claim 1, wherein the second sensor comprises an acoustic sensor, and wherein receiving the indication of the user interaction with the computing device comprises receiving the indication of the user interaction based on one or more sounds captured by the acoustic sensor.

11. The method of claim 1,
   wherein the computing device comprises a plurality of sensors configured to detect the user contact with at least one surface of the computing device,
   wherein the computing device is configured to, while the computing device is not operating in the active state, operate a subset of the plurality of sensors configured to detect user touch with the at least one surface of the computing device to detect the user input; and
   wherein receiving the at least one indication of the user contact comprises receiving the at least one indication of the user contact with the at least one surface of the computing device based on detection of the user contact using the subset of the plurality of sensors.

12. The method of claim 1, further comprising:
   receiving at least a second indication of a user contact with at least a second surface of the computing device, wherein the second surface of the computing device comprises a first edge of the computing device,
   wherein the at least one surface of the computing device comprises a second edge of the computing device, wherein the second edge is opposite the first edge of the computing device; and
   wherein modifying the power consumption state of the second sensor of the computing device further comprises modifying the power consumption state of the second sensor in response to receiving at least the second indication of user contact.

13. The method of claim 12, wherein modifying the power consumption state of the second sensor further comprises modifying the power consumption state in response to receiving at least the second indication of the user contact while receiving the at least one indication of the user contact.

14. The method of claim 1, wherein receiving the at least one indication of the user contact with the at least one surface of the computing device further comprises comparing the at least one indication of the user contact with one or more touch patterns.

15. The method of claim 14, wherein receiving the at least one indication of the user contact with the at least one surface of the computing device further comprises determining the at least one indication of the user contact conforms with a touch pattern within a threshold limit, wherein the touch pattern is similar to an outline of a human hand touching the computing device.

16. A non-transitory computer-readable medium comprising instructions for causing a programmable processor to perform operations comprising:
   while a power consumption state comprises a powered-down state, receiving at least one indication of a user contact with at least one surface of the computing device, wherein the user contact is detected by a first sensor of the computing device, and wherein the at least one indication of the user contact conforms with a touch pattern;
   activating, responsive to receiving the at least one indication of the user contact, at least one second sensor of the computing device;
   receiving an indication of a user interaction with the computing device, wherein the user indication is detected by the second sensor; and
   responsive to receiving the at least one indication of the user interaction and the indication of user interaction with the computing device, modifying the power consumption state of the computing device from the powered-down state to an active state, wherein the active state determines which of a plurality of components of the computing device are powered on.

17. A computing device, comprising:
   a first sensor;
   a second sensor;
   at least one surface of the computing device; and
   one or more processors configured to:
      while a power consumption state of the computing device comprises a powered-down state, receive at least one indication of a user contact with at least one surface of the computing device, wherein the user contact is detected by the first sensor, and wherein the at least one indication of the user contact conforms with a touch pattern, and responsive to receiving the at least one indication of the user contact with the at least one surface of the computing device:
      modify a power consumption state of a second sensor of the computing device,
      receive, by the computing device, an indication of a user interaction with the computing device, wherein the user interaction is detected by the second sensor, and
      responsive to receiving the indication of the user interaction with the computing device, modify the power consumption state of the computing device from the powered-down state to an active state, wherein the active state determines which of a plurality of components of the computing device receive power.

* * * * *